United States Patent
Bundren et al.

(10) Patent No.: US 10,299,509 B2
(45) Date of Patent: May 28, 2019

(54) PRODUCTS OF HIGH DENIER PER FILAMENT AND LOW TOTAL DENIER TOW BANDS

(71) Applicant: Celanese Acetate LLC, Irving, TX (US)

(72) Inventors: Christopher M. Bundren, Blacksburg, VA (US); William S. Sanderson, Blacksburg, VA (US); Paul Busby, Blacksburg, VA (US); Edward J. Clark, Pearisburg, VA (US)

(73) Assignee: Acetate International LLC, Irving, TX (US)

( * ) Notice: Subject to any disclaimer, the term of this patent is extended or adjusted under 35 U.S.C. 154(b) by 1090 days.

(21) Appl. No.: 14/601,421

(22) Filed: Jan. 21, 2015

(65) Prior Publication Data

US 2015/0128964 A1    May 14, 2015

Related U.S. Application Data

(62) Division of application No. 13/288,261, filed on Nov. 3, 2011, now Pat. No. 8,967,155.

(51) Int. Cl.
| | | |
|---|---|---|
| A24D 1/00 | (2006.01) | |
| A24D 3/06 | (2006.01) | |
| D02G 1/00 | (2006.01) | |
| D02G 1/12 | (2006.01) | |
| D02G 1/14 | (2006.01) | |
| A24D 3/02 | (2006.01) | |
| A24D 3/04 | (2006.01) | |
| A24F 1/30 | (2006.01) | |

(Continued)

(52) U.S. Cl.
CPC .............. *A24D 3/06* (2013.01); *A24D 1/00* (2013.01); *A24D 3/02* (2013.01); *A24D 3/04* (2013.01); *A24D 3/063* (2013.01); *A24F 1/30* (2013.01); *A24F 13/02* (2013.01); *A24F 47/008* (2013.01); *D02G 1/00* (2013.01); *D02G 1/12* (2013.01); *D02G 1/14* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 2,825,120 | A | 3/1958 | Kodak |
| 2,940,456 | A | 6/1960 | Kodak |

(Continued)

FOREIGN PATENT DOCUMENTS

| | | | |
|---|---|---|---|
| JP | 2003159043 | | 6/2003 |
| JP | 2007319041 | A | 12/2007 |

(Continued)

OTHER PUBLICATIONS

Official Action for Eurasian Patent Application 201490914/31 dated Apr. 28, 2016.

(Continued)

*Primary Examiner* — Michael J Felton
(74) *Attorney, Agent, or Firm* — Vorys, Sater, Seymour and Pease LLP

(57) ABSTRACT

A method for forming a filter rod may include providing a bale of crimped tow band having about 10 denier per filament or greater and about 20,000 total denier or less, the crimped tow band comprising a plurality of cellulose acetate filaments; and placing the crimped tow band in an apparatus so as to form a filter rod.

15 Claims, 2 Drawing Sheets

(51) Int. Cl.
*A24F 13/02* (2006.01)
*A24F 47/00* (2006.01)

(56) References Cited

U.S. PATENT DOCUMENTS

| | | | |
|---|---|---|---|
| 3,272,638 | A | 9/1966 | Kodak |
| 3,590,825 | A | 7/1971 | Davis |
| 3,620,227 | A | 11/1971 | Saito et al. |
| 3,648,712 | A | 3/1972 | Patterson |
| 5,076,294 | A | 12/1991 | Kramer |
| 5,269,329 | A | 12/1993 | Geer et al. |
| 6,223,895 | B1 | 5/2001 | Bowen et al. |
| 6,514,014 | B1 | 2/2003 | Holmes et al. |
| 6,924,029 | B1 | 8/2005 | Caenen et al. |
| 7,569,510 | B2 | 8/2009 | Deevi et al. |
| 7,585,441 | B2 | 9/2009 | Caenen et al. |
| 7,610,852 | B2 | 11/2009 | Bundren et al. |
| 8,967,155 | B2 | 3/2015 | Bundren et al. |
| 2005/0288163 | A1 | 12/2005 | Caenen et al. |
| 2011/0023900 | A1 | 2/2011 | Clarke et al. |
| 2011/0162667 | A1 | 7/2011 | Burke et al. |

FOREIGN PATENT DOCUMENTS

| | | |
|---|---|---|
| KR | 10-0714525 | 5/2007 |
| KR | 10-0845011 B1 | 7/2008 |
| KR | 10-0849277 B1 | 7/2008 |
| KR | 10-1677002 B1 | 11/2016 |
| KR | 10-1677818 B1 | 11/2016 |
| WO | 2006007013 A2 | 1/2006 |
| WO | 2009093051 | 7/2009 |

OTHER PUBLICATIONS

Office Action received in corresponding Chilean Application No. 1130-2014, dated Sep. 14, 2016.
Official Action for Colombian Patent Application 14115458 dated Nov. 30, 2015.
Official Action for Colombian Patent Application 14115458 dated Jun. 1, 2016.
Office Action received in corresponding Eurasian Application No. 201490914/31, dated Apr. 28, 2016.
Official Action for Ukrainian Patent Application No. 2014 06042 dated Oct. 22, 2015.
Renfro, "The effect of filter variability on cigarette performance," Eastman Chemical Company, Kingsport, TN, USA, CORESTA Congress, Yokohama, 1996, p. 226, T7.
Mathis, "Component Analysis of Pressure Drop and Ventilation Variability," Rsearch Laboratories, Eastman Chemicals Division, Eastman Kodak Company, Kingsport, TN, USA, Beitrage zur Tabakforschung International vol. 12, No. 4, Jul. 1984, DOI: 10.2478/cttr-2013-0538.
"Mathematics of Crimping," Warrick Cooke, St. Catherine's College, University of Oxford, A thesis submitted for the degree of Doctor of Philosophy, Jun. 2000.

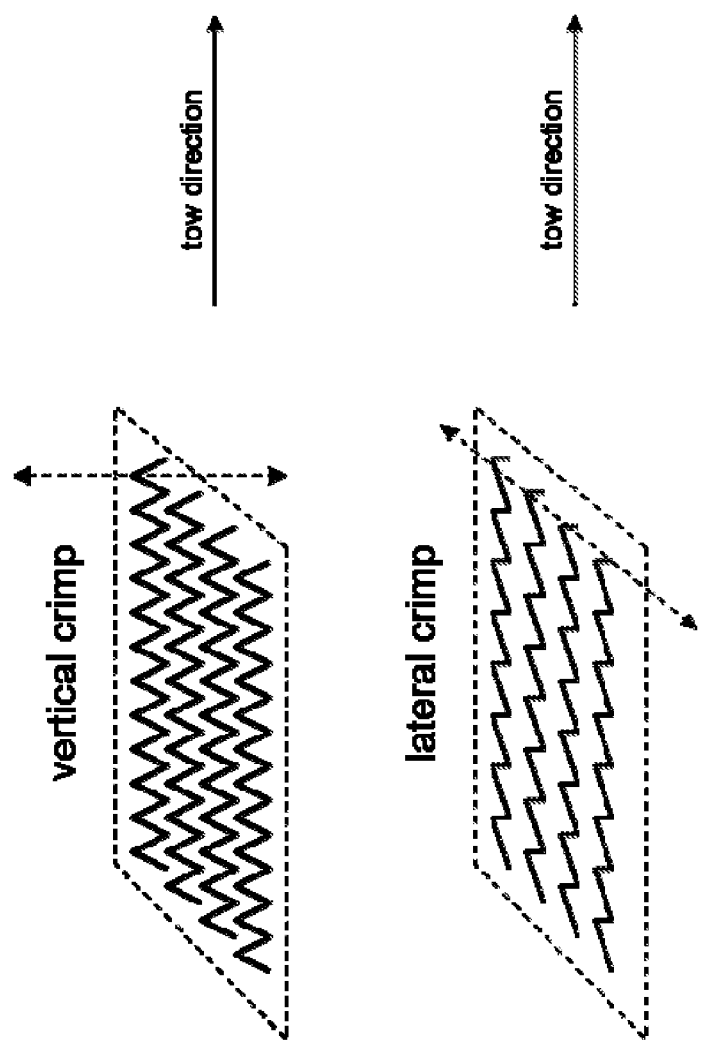

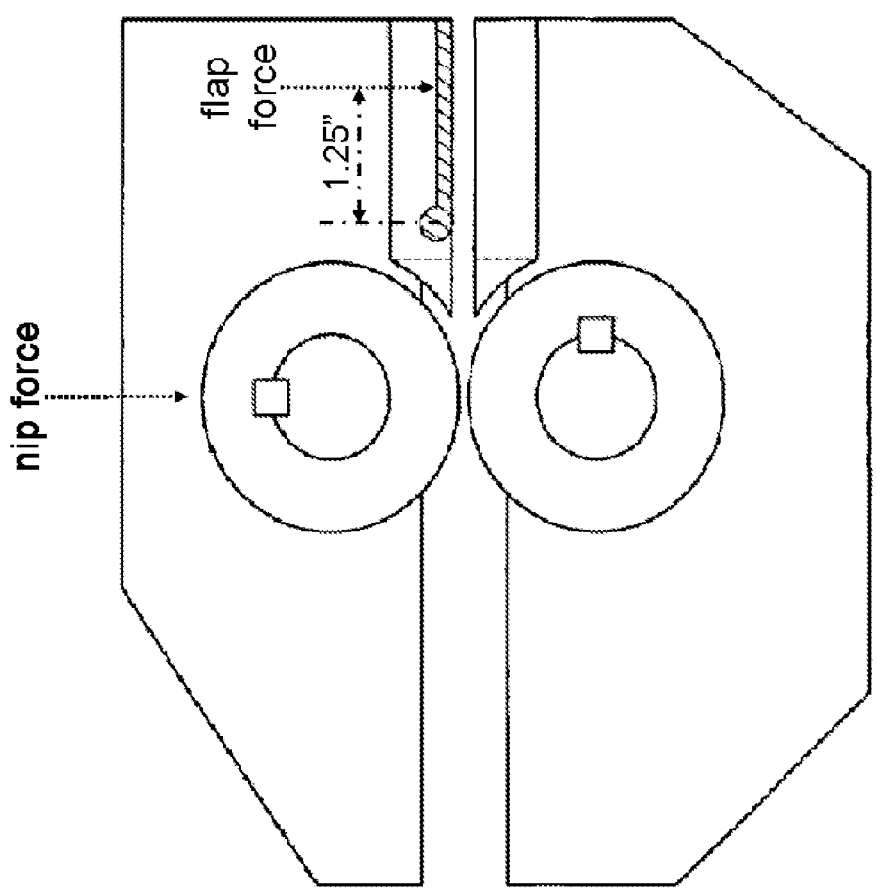

PRODUCTS OF HIGH DENIER PER FILAMENT AND LOW TOTAL DENIER TOW BANDS

BACKGROUND

The present invention relates to high denier per filament and low total denier cellulose acetate tow bands and smoking device filters produced therefrom.

The draw resistance of other smoking articles, e.g., cigarettes, is a major determinant of the draw characteristic(s) of the cigarette which are experienced by a smoker. In cellulose acetate filters, draw characteristics may depend on several factors including the cellulose acetate filament characteristics, the amount of cellulose acetate filaments, and the concentration of additives incorporated in said filaments. One measure of draw characteristics is the encapsulated pressure drop. As used herein, the term "encapsulated pressure drop" or "EPD" refers to the static pressure difference between the two ends of a specimen when it is traversed by an air flow under steady conditions when the volume flow is 17.5 ml/sec at the output end when the specimen is completely encapsulated in a measuring device so that no air can pass through the wrapping. EPD has been measured herein under the CORESTA ("Cooperation Centre for Scientific Research Relative to Tobacco") Recommended Method No. 41, dated June 2007. Higher EPD values translate to the smoker having to draw on a smoking device with greater force.

Currently, the desired draw resistance for cellulose acetate filters is achieved by forming filters from tow bands having low denier per filament (dpf) and high total denier, i.e., lots of filaments each with a small cross-sectional area. The small cross-sectional area is believed to provide high surface area, which translates to higher filtering efficacy.

However, these low dpf, high total denier tow bands have issues when responding to markets that are trending to smaller-diameter smoking articles and jurisdictions having increasing regulations that require increased filter efficacy. First, producing smaller diameter smoking articles with these known tow bands effectively condenses the filaments into a smaller space, which increases the EPD and changes the draw characteristics as a result. Second, increasing the filter efficacy of the high total denier of these tow bands would require more surface area, e.g., more filaments, which would exacerbate the higher EPD issue. Additionally, the inclusion of particles that actively remove smoke components from a smoke screen (e.g., carbon) fill the voids of the filters leading to higher EPDs.

Therefore, among other things, a need exists for tow bands capable of producing filters that can respond to market trends for smaller diameter cigarettes, e.g., about 17 mm circumference or less, and increasing jurisdictional regulations while maintaining the draw characteristics appealing to smokers.

SUMMARY OF THE INVENTION

The present invention relates to high denier per filament and low total denier cellulose acetate tow bands and smoking device filters produced therefrom.

In some embodiments, the present invention provides a method comprising: providing a tow band having about 10 denier per filament or greater and about 20,000 total denier or less, the tow band comprising a plurality of cellulose acetate filaments; crimping the tow band thereby yielding a crimped tow band; conditioning the crimped tow band; and baling the crimped tow band to form a bale.

In some embodiments, the present invention provides a method comprising: providing a plurality of cellulose acetate filaments, the filaments having about 10 denier per filament or greater; treating the filaments with a finish emulsion comprising about 95% water or less thereby yielding a plurality of finished filaments; forming a tow band from at least a portion of the finished filaments, the tow band having about 20,000 total denier or less; crimping the tow band thereby yielding a crimped tow band comprising filaments with a substantially lateral crimp configuration; conditioning the crimped tow band; and baling the crimped tow band to form a bale.

In some embodiments, the present invention provides a method comprising: providing a tow band having about 10 denier per filament or greater and about 20,000 total denier or less, the tow band comprising a plurality of cellulose acetate filaments, and the tow band having a moisture content of about 5% to about 25% w/w of the tow band; crimping the tow band thereby yielding a crimped tow band comprising filaments with a substantially lateral crimp configuration; conditioning the crimped tow band; and baling the crimped tow band to form a bale.

In some embodiments, the present invention provides a method comprising: providing a tow band having about 10 denier per filament or greater and about 20,000 total denier or less, the tow band comprising a plurality of cellulose acetate filaments; applying a tackifier to at least a portion of the filaments; crimping the tow band thereby yielding a crimped tow band; conditioning the crimped tow band; and baling the crimped tow band to form a bale.

In some embodiments, the present invention provides a method comprising: providing a tow band having about 10 denier per filament or greater and about 20,000 total denier or less, the tow band comprising a plurality of cellulose acetate filaments; applying a tackifier to at least a portion of the filaments; crimping the tow band thereby yielding a crimped tow band; conditioning the crimped tow band; and baling the crimped tow band to form a bale.

In some embodiments, the present invention provides a bale comprising: a crimped tow band having about 10 denier per filament or greater and about 20,000 total denier or less, the crimped tow band comprising a plurality of cellulose acetate filaments.

In some embodiments, the present invention provides a method comprising: providing a bale of crimped tow band having about 10 denier per filament or greater and about 20,000 total denier or less, the crimped tow band comprising a plurality of cellulose acetate filaments; and placing the crimped tow band in an apparatus so as to form a filter rod.

In some embodiments, the present invention provides a filter comprising: a tow having about 10 denier per filament or greater and about 20,000 total denier or less, the tow comprising a plurality of cellulose acetate filaments, the filter having an encapsulated pressure drop of about 3.5 mm water/mm length of filter or less, and the filter having a circumference of about 26 mm or less.

In some embodiments, the present invention provides a filter comprising: a tow having about 10 denier per filament or greater and about 20,000 total denier or less, the tow comprising a plurality of cellulose acetate filaments; and an additive; the filter having an encapsulated pressure drop of about 3.5 to about 20 mm water/mm length of filter, wherein without the additive the filter has an encapsulated pressure drop of about 3 mm water/mm length of filter or less, and the filter having a circumference of about 26 mm or less.

In some embodiments, the present invention provides a filter comprising: a tow comprising a plurality of cellulose acetate filaments; and an additive; the filter having an encapsulated pressure drop of about 3.5 to about 20 mm water/mm length of filter, wherein without the additive the filter has an encapsulated pressure drop of about 3 mm water/mm length of filter or less, and the filter having a circumference of about 26 mm or less.

In some embodiments, the present invention provides a smoking device comprising: a smokeable substance; and a filter comprising a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 17 mm or less.

In some embodiments, the present invention provides a smoking device filter comprising: a first section that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less; and a second filter section.

In some embodiments, the present invention provides a smoking device comprising: a filter having a circumference of about 26 mm or less and comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less; and a housing capable of maintaining a smokeable substance in fluid contact with the filter.

In some embodiments, the present invention provides a pack of filters comprising: a pack comprising at least a plurality of filters having a circumference of about 26 mm or less, the filters comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less.

In some embodiments, the present invention provides a pack of smoking devices comprising: a pack comprising at least one smoking device that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less.

In some embodiments, the present invention provides a pack of smoking devices comprising: a pack comprising at least one smoking device that comprises a filter having a circumference of about 26 mm or less, the filters comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less.

In some embodiments, the present invention provides a carton of smoking device packs comprising: a carton comprising at least one pack, the pack comprising at least one smoking device that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less.

In some embodiments, the present invention provides a method of smoking a smoking device, the method comprising: heating or lighting a smoking device to form smoke, wherein the smoking device comprises at least one filter section comprising a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; and drawing the smoke through the smoking device, wherein the filter section reduces the presence of at least one component in the smoke as compared to a filter without the filter section.

In some embodiments, the present invention provides a method for making a filter rod, the method comprising: providing a first filter section; providing at least one second filter section, wherein the second filter section comprises a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; and joining the first filter section and at least one second filter section so as to form a filter rod.

In some embodiments, the present invention provides a method for making a filter rod, the method comprising: providing a first filter section; providing at least one second filter section, wherein the second filter section has a circumference of about 26 mm or less and comprises an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less; and joining the first filter section and at least one second filter section so as to form a filter rod.

In some embodiments, the present invention provides a method comprising: providing a container that comprises at least a plurality of first filter sections; providing a second container comprising at least a plurality of second filter sections, wherein the second filter sections comprise a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less; joining a first filter section and a second filter section end-to-end along the longitudinal axis of the first filter and the second filter to form an unwrapped filter rod; and wrapping the first filter section and the second filter section with a paper to form a filter rod.

In some embodiments, the present invention provides a method of making a smoking device, the method comprising: providing a filter rod comprising at least one filter section that comprises a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; providing a tobacco column; cutting the filter rod transverse to its longitudinal axis through the center of the rod to form at least two smoking device filters having at least one filter section that comprises a porous mass that comprises an active particle and a binder particle; and joining at least one of the smoking device filters to the tobacco column along the longitudinal axis of the filter and the longitudinal axis of the tobacco column to form at least one smoking device.

In some embodiments, the present invention provides a method of making a smoking device, the method comprising: providing a tobacco column; joining a filter to the tobacco column, wherein the filter comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 17 mm or less.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIG. 1 illustrates the orientations of a lateral crimp and a vertical crimp.

FIG. 2 illustrates the force locations for the nip force and flap force of a stuffer box.

DETAILED DESCRIPTION

The present invention relates to high denier per filament and low total denier cellulose acetate tow bands and smoking device filters produced therefrom.

The present invention provides cellulose acetate tow bands with a high denier per filament (dpf) and a low total denier, which may be useful for producing smoking device filters with previously unrealized encapsulated pressure drop (EPD) and circumference combinations. In some embodiments, the cellulose acetate tow bands of the present invention may be useful for producing regular circumference (e.g., about 26 to about 32 mm) filters with an ultra-low EPD (e.g., about 1 mm water/mm filter or less). In some embodiments, the cellulose acetate tow bands of the present invention may be useful for producing slim to ultra-slim circumference (e.g., about 17 mm to about 26 mm) filters with a low EPD (e.g., about 2.5 mm water/mm filter or less). In some embodiments, the cellulose acetate tow bands of the present invention may be useful for producing micro-slim circumference (e.g., about 17 mm or less) filters with the EPD of current regular circumference cellulose acetate filters (e.g., about 3.5 mm water/mm filter or less). In some embodiments, the reduced EPD achieved with the cellulose acetate tow bands of the present invention may be useful for increasing additive loading to achieve a desired EPD for a given circumference filter. In some embodiments, the reduced EPD achieved with the cellulose acetate tow bands of the present invention may be useful for multi-sectioned filters to counterbalance high EPD sections. In some embodiments, the reduced EPD achieved with the cellulose acetate tow bands of the present invention may be useful for allowing higher conduction of fluids (e.g., smoke and components thereof) therethrough.

Further, the present invention provides production steps and/or parameters that yield high dpf and low total denier cellulose acetate tow bands that may integrate substantially seamlessly into current manufacturing processes, i.e., debaling with a low fault index. As used herein, the term "fault index" refers to the degree to which defects are produced in the tow band as it is debaled. The fault index is a weighted index with longer defects carrying higher weights. Generally the fault index is assessed over a set period of time, e.g., about 5-10 minutes, by observing the tow band leaving the bale prior to entering the downstream equipment used to produce smoking device filters. The test is typically conducted at very high speeds to magnify the potential for defects, e.g., 480 m/min tow debaling speed. Such speeds can be achieved with a KDF2/AF2 rod maker (available from Hauni) set at 400 mpm KDF tape speed. The AF2 opening system speeds are set to achieve a mid-point in the item capability range. One skilled in the art should understand the equivalent settings for other apparatuses to conduct such testing.

Table 1 shows a nonlimiting example of how to calculate a fault index. In some embodiments, the fault indexes associated with the tow bands of the present invention may be about 100 or less, about 75 or less, or most preferably about 50 or less.

TABLE 1

| Defect Length | # Defects | Multiply By | Totals |
| --- | --- | --- | --- |
| 0-1 inch | 5 | 1 | 5 |
| 1-4 inches | 3 | 5 | 15 |
| greater than 4 inches | 2 | 100 | 200 |
| | | FAULT INDEX | 220 |

By way of nonlimiting example, debaling and/or fault index may be affected by the cohesiveness of the filaments in the tow band, i.e., how well they maintain structural integrity while being loaded into a filter making apparatus. Because high dpf, low total denier tow bands comprise a relatively low number of filaments, the overall structural integrity of the tow band is less than that of a low dpf, high total denier tow band that comprises a relative high number of filaments. To overcome this, some embodiments of the present invention provide tow band production parameters (e.g., lateral crimping) that improve the cohesiveness of the filaments, which translates to higher overall structural integrity of the tow band and consequently lower fault index debaling.

Nonlimiting examples of how to achieve the proper level of cohesiveness according to the present invention in a high dpf, low total denier tow band may include, but not be limited to, tow bands having a substantially lateral crimp configuration or tow bands having a substantially vertical crimp configuration wherein the filaments are bonded at a plurality of contact points. Each of which are described in more detail herein.

It should be noted that when "about" is provided below in reference to a number in a numerical list, the term "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

I. Bales and Methods of Producing

Generally, the production of a bale of tow bands may involve spinning filaments from a dope, forming a tow band from the filaments, crimping the tow band, and baling the crimped tow band. Within said production, optional steps may include, but not be limited to, warming the filaments after spinning, applying a finish or additive to the filaments and/or tow band prior to crimping, and conditioning the crimped tow band. The parameters of at least these steps are important for producing bales capable of producing smoking device filters described herein. It should be noted that bales may vary in size and shape as needed for further processing.

In some embodiments, filaments for use in the present invention may be high dpf filaments, i.e., about 10 denier per filament (dpf) or greater. In some embodiments, filaments for use in the present invention may be about 11 denier per filament (dpf) or greater. In some embodiments, filaments for use in the present invention may be about 12 denier per filament (dpf) or greater. In some embodiments, the filaments may range from a lower limit of about 10 dpf, 11 dpf, 12 dpf, or 13 dpf to an upper limit of about 30 dpf, 25 dpf, 20 dpf, or 15 dpf, wherein the dpf of the filaments may range from any upper limit to any lower limit and encompass any subset therebetween.

The filaments for use in the present invention may have any suitable cross-sectional shape, including, but not limited to, circular, substantially circular, crenulated, ovular, substantially ovular, polygonal, substantially polygonal, dog-bone, "Y," "X," "K," "C," multi-lobe, and any hybrid thereof. As used herein, the term "multi-lobe" refers to a cross-sectional shape having a point (not necessarily in the center of the cross-section) from which at least two lobes extend (not necessarily evenly spaced or evenly sized).

Filaments for use in the present invention may be produced by any method known to one skilled in the art. In some embodiments, filaments may be produced by spinning a dope through a spinneret. As used herein, the term "dope" refers to a polymer solution and/or suspension from which filaments are produced. In some embodiments, a dope may comprise polymers and solvents. In some embodiments, a dope for use in conjunction with the present invention may comprise polymers, solvents, and additives. It should be noted that additives are further detailed herein. In some embodiments, the polymer may be at a concentration in the dope ranging from about 20 to about 40 percent by weight. In some embodiments, the dope may be heated to a temperature ranging from about 40° C. to about 100° C.

Suitable polymers may include, but not be limited to, cellulose acetates, cellulose triacetates, cellulose propionates, cellulose butyrates, cellulose acetate-propionates, cellulose acetate-butyrates, cellulose propionate-butyrates, starch acetates, acrylonitriles, vinyl chlorides, vinyl esters, vinyl ethers, and the like, any derivative thereof, any copolymer thereof, and any combination thereof. In some embodiments, suitable cellulose acetates may have a degree of substitution less than about 3 acetyl groups per glucose unit, preferably in the range of about 2.2 to about 2.8, and most preferably in the range of about 2.4 to about 2.6.

Suitable solvents may include, but not be limited to, water, acetone, methylethyl ketone, methylene chloride, dioxane, dimethyl formamide, methanol, ethanol, glacial acetic acid, supercritical $CO_2$, any suitable solvent capable of dissolving the aforementioned polymers, or any combination thereof. By way of nonlimiting example, a solvent for cellulose acetate may be an acetone/methanol mixture.

The spinneret design and/or spinning parameters may affect the rate at which the solvent evaporates from the filament, which may affect the size, cross-sectional shape, strength, and processability of the filaments. In some embodiments, a spinneret may comprise a plurality of holes spaced at least 0.070 inches apart. In some embodiments, spinnerets for use in conjunction with the present invention may comprise a plurality of extrusion holes in a donut configuration. As used herein, "donut configuration" refers to any shape (circular, ovular, polygonal, and the like) having a void in the middle, wherein the void does not have holes for extrusion. As used herein, the terms "holes" and "extrusion holes," when used in conjunction with a spinneret design, may be used interchangeably referring generally to openings through which the dope is extruded. In some embodiments, extrusion holes may be tapered, e.g., countersinks, with capillary exits. Tapering may be at a constant angle or at a more than one angle. In some embodiments, extrusion holes within a single spinneret may have different tapering angles. In some embodiments, the extrusion holes and/or capillary exits may have a cross-sectional shape that produces a desired filament cross-sectional shape. Examples of extrusion hole and/or capillary exit cross-sectional shapes may include, but not be limited to, circular, substantially circular, ovular, substantially ovular, crescent, multi-lobal, polygonal (e.g., like tripods, tetrapods, stars, triangles, squares, trapezoids, pentagons, hexagons, and so on with sides of even lengths or varying lengths), polygonal with rounded corners, and any hybrid thereof. In some embodiments, a spinneret may comprise at least two different cross-sectional shaped extrusion holes and/or capillary exits. In some embodiments, a spinneret may comprise at least two different size extrusion holes and/or capillary exits. In some embodiments, the size and/or cross-sectional shape of an extrusion hole may vary from that of the corresponding capillary exit.

In some embodiments, the spinning parameters may include extruding filaments at a drawdown ratio (fiber exit speed to take-up speed) ranging from about 0.7 to about 1.6.

It should be understood by one skilled in the art that extruding does not imply a single method or action for producing the filaments and could be interchanged with, at least, spinning, expelling, and the like.

Some embodiments of the present invention may involve heating the filaments to a temperature at or above about the evaporation temperature of the solvent to assist in removal of the solvent. Heating may be in the form of direct heat, indirect heat, or any combination thereof. Further, heating may involve heaters, heated enclosures (e.g., cabinets or tunnels), heated surfaces (e.g., hot shoes), microwaves, irradiation sources that cause additives in the filaments (e.g., nanoparticles) to produce heat, or any combination thereof.

Some embodiments of the present invention may involve treating filaments to achieve surface functionality on the filaments. In some embodiments, filaments may comprise a surface functionality including, but not limited to, biodegradability sites (e.g., defect sites to increase surface area to enhance biodegradability), chemical handles (e.g., carboxylic acid groups for subsequent functionalization), active particle binding sites (e.g., sulfide sites binding gold particles or chelating groups for binding iron oxide particles), sulfur moieties, or any combination thereof. One skilled in the art should understand the plurality of methods and mechanisms to achieve surface functionalities. Some embodiments may involved dipping, spraying, ionizing, functionalizing, acidizing, hydrolyzing, exposing to a plasma, exposing to an ionized gas, or any combination thereof to achieve surface functionalities. Suitable chemicals to impart a surface functionality may be any chemical or collection of chemicals capable of reacting with cellulose acetate including, but not limited to, acids (e.g., sulfuric acid, nitric acid, acetic acid, hydrofluoric acid, hydrochloric acid, and the like), reducing agents (e.g., $LiAlH_4$, $NaBH_4$, H₂/Pt, and the like), Grignard reagents (e.g., $CH_3MgBr$, and the like), trans-esterification reagent, amines (e.g., R—$NH_3$ like $CH_3NH_3$), or any combination thereof. Exposure to plasmas and/or ionized gases may react with the surface, produce defects in the surface, or any combination thereof. Said defects may increase the surface area of the filaments which may yield higher loading and/or higher filtration efficacy in the final filter products.

Some embodiments of the present invention may involve applying a finish to the filaments. Suitable finishes may include, but not be limited to, at least one of the following: oils (e.g., mineral oils or liquid petroleum derivatives), water, additives, or any combination thereof. Examples of suitable mineral oils may include, but not be limited to, water white (i.e., clear) mineral oil having a viscosity of 80-95 SUS (Sabolt Universal Seconds) measured at 38° C. (100° F.). Examples of suitable emulsifiers may include, but not be limited to, sorbitan monolaurate, e.g., SPAN® 20 (available from Uniqenna, Wilmington, Del.), poly(ethylene oxide) sorbitan monolaurate, e.g., TWEEN® 20 (available from Uniqenna, Wilmington, Del.). The water may be de-mineralized water, de-ionized water, or otherwise appropriately filtered and treated water.

In some embodiments of the present invention, finish may be applied as a neat finish or as a finish emulsion in water. As used herein, the term "neat finish" refers to a finish formulation without the addition of excess water. It should be noted that finish formulations may comprise water. In some embodiments, finish may be applied neat followed by applying water separately.

In some embodiments of the present invention, a finish emulsion may comprise less than about 98% water, less than about 95%, less than about 92%, or less than about 85%. In some embodiments, it may be advantageous in later steps to have filaments having a lower weight percentage of moisture (e.g., about 5% to 25% w/w of the tow band), of which water is a contributor. The water content of the finish emulsion may be at least one parameter that may assist in achieving said weight percentage of moisture in the filaments. Therefore, in some embodiments, a finish emulsion may comprise less than about 92% water, less than about 85% water, or less than about 75% water.

Some embodiments of the present invention may include forming tow bands from a plurality of filaments. In some embodiments, a tow band may be about 20,000 total denier or less. In some embodiments, a tow band may be about 15,000 total denier or less. In some embodiments, a tow band may be about 10,000 total denier or less. In some embodiments, a tow band may range from a lower limit of about 1,000 total denier, 1,500 total denier, 2,500 total denier, or 5,000 total denier to an upper limit of about 20,000 total denier, 15,000 total denier, 10,000 total denier, or 9,000 total denier, and wherein the tow band may range from any upper limit to any lower limit and encompass any subset therebetween. In some embodiments of the present invention, a tow band may have about 10 dpf or greater and about 20,000 total denier.

In some embodiments of the present invention, a tow band may comprise more than one type of filament. In some embodiments, the more than one type of filament may vary based on dpf, cross-sectional shape, composition, treatment prior to forming the tow band, or any combination thereof. Examples of suitable additional filaments may include, but are not limited to, carbon filaments, activated carbon filaments, natural fibers, synthetic filaments, cellulose acetate filaments with a denier per filament of less than about 10, or any combination thereof.

Some embodiments of the present invention may include crimping the tow band to form a crimped tow band. Crimping the tow band may involve using any suitable crimping technique known to those skilled in the art. These techniques may include a variety of apparatuses including, but not limited to, a stuffer box or a gear. Nonlimiting examples of crimping apparatuses and the mechanisms by which they work can be found in U.S. Pat. Nos. 7,610,852 and 7,585,441, the relevant disclosures of which are incorporated herein by reference. Suitable stuffer box crimpers may have smooth crimper nip rolls, threaded or grooved crimper nip rolls, textured crimper nip rolls, upper flaps, lower flaps, or any combination thereof.

The configuration of the crimp may play a role in the processability of the final bale. Examples of crimp configurations may include, but not be limited to, lateral, substantially lateral, vertical, substantially vertical, some degree between lateral and vertical, random, or any combination thereof. As used herein, the term "lateral" when describing crimp orientation refers to crimp or fiber bends substantially in the plane of the tow band, see FIG. 1. As used herein, the term "vertical" when describing a crimp orientation refers to crimp projecting substantially outside of the plane of the tow band and substantially perpendicular to the plane of the tow band, see FIG. 1. It should be noted that the terms lateral and vertical refer to general overall crimp orientation and may have deviation from said configuration by +/− about 30 degrees. As used herein, "substantially" modifying lateral or vertical should be taken to mean within a deviation from said configuration of +/− about 45 degrees.

In some embodiments of the present invention, a crimped tow band may comprise filaments with a first crimp configuration and filaments with a second crimp configuration.

In some embodiments of the present invention, a crimped tow band may comprise filaments with at least a substantially vertical crimp configuration near the edges and filaments with at least a substantially lateral crimp configuration near the center. In some embodiments, a crimped tow band may comprise filaments with a vertical crimp configuration near the edges and filaments with a lateral crimp configuration near the center.

The configuration of the crimp may be important for the processability of the final bale in subsequent processing steps, e.g., a lateral and/or substantially lateral crimp configuration may provide better cohesion of filaments than a vertical and/or substantially vertical crimp configuration unless further steps are taken to enhance cohesion. To achieve a lateral crimp, at least one of three processing parameters may be manipulated, e.g., the water content of the tow band prior to crimping, the thickness of the tow band during crimping, and the nip to flap force ratio during crimping.

To achieve a lateral and/or substantially lateral crimp configuration, it may be desirable to perform crimping on a tow band comprising filaments having a lower weight percentage of total moisture. As used herein the term "moisture" refers to the acetone and water components. In some embodiments, the weight percent of moisture in a tow band to achieve lateral crimping may range from a lower limit of about 5%, 7%, 10%, or 15% to an upper limit of about 25%, 22%, 20%, or 17% w/w of the tow band, and wherein the weight percent of moisture may range from any lower limit to any upper limit and encompass any subset therebetween. In some embodiments a lower weight percentage of moisture may be achieved by drying the tow band prior to crimping (e.g., actively with a heat source and/or passively by allowing the filaments to dry in ambient conditions), applying a higher solids concentration or finish emulsion with less water content, applying a neat finish followed by separate control water addition, reducing or eliminating any other moisture contributing tow band additions, altering the spinning conditions so as to reduce the moisture content of the fiber leaving the spinning cell (higher temp, slower speed, higher air flow in heating cabinet, change concentration of dope), or any combination thereof.

Further, a lateral and/or substantially lateral crimp configuration may be achieved by crimping a thinner tow band, i.e., reducing the total denier per inch of crimper nip roll width. In some embodiments, total denier per inch of crimper nip roller width may be about 60,000 or less, about 50,000 or less, or about 40,000 or less. Suitable total denier per inch of crimper nip roller width may range from a lower limit of about 5,000, 10,000, 15,000, or 20,000 to an upper limit of 60,000, 50,000, 40,000, 35,000, or 30,000 and wherein the total denier per inch of crimper nip roller width may range from any lower limit to any upper limit and encompass any subset therebetween.

Further, a lateral and/or substantially lateral crimp configuration may be achieved by crimping with a reduced nip to flap force ratio, i.e., the ratio of applied nip force to applied flap force. As used herein, nip force refers to the force pushing the two nip rolls together applied in a normal direction (i.e., perpendicular to the nip roll axis and directly in line with the two rolls), as shown in FIG. 2. As used herein, flap force refers to the force applied normal to the flapper at a distance of 1.25 inches from the centerline of the flapper pivot, as shown in FIG. 2. In some embodiments, the nip to flap force ratio may be about 100:1 or less, about 50:1 or less, or about 25:1 or less. Suitable nip to flap force ratios may range from a lower limit of about 3:1, 5:1, or 10:1 to an upper limit of about 100:1, 50:1, or 25:1, and wherein the nip to flap ratio may range from any lower limit to any upper limit and encompass any subset therebetween. One skilled in the art, with the benefit of this disclosure, should understand that changing the point at which force is applied normal to the flapper will change the nip to flap ratio. Further, one skilled in the art should understand the equivalent nip to flap ratios when the point at which force is applied normal to the flapper is changed. The ranges given above extend to said equivalent nip to flap ratios.

It should be noted that at least two of the foregoing methods of achieving a lateral and/or substantially lateral crimp configuration may be used in any combination. It should also be noted that when used in combination the aforementioned parameter limitations may be expanded as the combination may have synergistic effects. By way of nonlimiting example, a tow band with about 27% moisture w/w of the tow band that undergoes crimping at a nip to flap force ratio of about 15:1 with a total denier per inch of crimper nip roll width of about 25,000 may yield a lateral and/or substantially lateral crimp configuration.

In some embodiments of the present invention, the filaments may be adhered to each other to provide better processability of the final bale. While adhesion additive may be used in conjunction with any crimp configuration, it may be advantageous to use adhesion additives with a vertical and/or substantially vertical crimp configuration. In some embodiments, adhering may involve adhesion additives on and/or in the filaments. Examples of such adhesion additives may include, but not be limited to, binders, adhesives, resins, tackifiers, or any combination thereof. It should be noted that any additive described herein, or otherwise, capable of adhering two filaments together may be used, which may include, but not be limited to, active particles, active compounds, ionic resins, zeolites, nanoparticles, ceramic particles, softening agents, plasticizers, pigments, dyes, flavorants, aromas, controlled release vesicles, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. Some embodiments of the present invention may involve adding adhesive additives to the filaments (in, on, or both) by incorporating the adhesive additives into the dope, incorporating the adhesive additives into the finish, applying the adhesive additives to the filaments (before, after, and/or during forming the tow band), applying the adhesive additives to the tow band (before, after, and/or during crimping), or any combination thereof.

Adhesive additives may be included in and/or on the filaments at a concentration sufficient to adhere the filaments together at a plurality of contact points to provide better processability of the final bale. The concentration of adhesive additives to use may depend on the type of adhesive additive and the strength of adhesion the adhesive additive provides. In some embodiments, the concentration of adhesive additive may range from a lower limit of about 0.01%, 0.05%, 0.1%, or 0.25% to an upper limit of about 5%, 2.5%, 1%, or 0.5% by weight of the tow band in the final bale. It should be noted that for additives that are used for more than adhesion, the concentration in the tow band in the final bale may be higher, e.g., about 25% or less.

Further, some embodiments of the present invention may involve heating the filaments before, after, and/or during crimping. While said heating may be used in conjunction with any crimp configuration, it may be advantageous to use said heating with a vertical and/or substantially vertical crimp configuration. Said heating may involve exposing the filaments of the tow band to steam, aerosolized compounds (e.g., plasticizers), liquids, heated fluids, direct heat sources, indirect heat sources, irradiation sources that causes additives in the filaments (e.g., nanoparticles) to produce heat, or any combination thereof.

In some embodiments of the present invention, the crimp may also be characterized by the uncrimping energy (UCE). As used herein, "UCE" is the amount of work required to uncrimp a tow band. UCE is the area under the load-elongation curve between defined load limits, per unit length of extended sample (at the upper load limit). Generally, UCE can be measured as follows:

preconditioning the tow band sample (24 hours at 22° C.+/−2° C. with relative humidity at 60%+/−2%), warming (about 20 minutes before conventional calibration) Instron tensile tester (Model 1130, crosshead gears—Gear #'s R1940-1 and R940-2, Instron Series IX-Version 6 data acquisition & analysis software, Instron 50 Kg maximum capacity load cell, Instron top roller assembly, 1"×4"×⅛" thick high grade Buna-N 70 Shore A durometer rubber grip faces), loading the preconditioned tow band sample (about a 76 cm length is looped over and spread evenly across the center of the top roller), pre-tensioning the tow band (gently pulling to 100 g+/−2 g per readout display), clamping each end of the sample in the lower grips to effect a 50 cm gauge length (clamping at the highest available pressure, but not exceeding the manufacturers recommendations) (gauge length measured from top of the rubber grips), and testing at a crosshead speed of 30 cm/minute until breaking the tow band.

The average of at least three data points provides the uncrimping energy as calculated by Formula 1.

UCE(gcm/cm)=(E*1000)/((D*2)+500)  Formula 1:

where energy (E), is in units of mm-kgf and displacement (D) is in units of mm. Energy (E), is the integrated area beneath the load-elongation curve between the load limits of 0.220 kg and 6.0 kg. Displacement (D), is the distance the top roller (or Instron x-head) moves from the starting position to that at the 6 kg load. It should be noted that for conventional total denier tows a 10 kg upper load limit is typically used. However, given the low breaking strengths of high dpf, low total denier tow bands, a 6 kg load limit is used to define UCE parameters herein.

When measured after baling, the UCE may range from a lower limit of about 30 gcm/cm, 50 gcm/cm, 100 gcm/cm, or 150 gcm/cm to an upper limit of about 350 gcm/cm, 300 gcm/cm, 250 gcm/cm, or 200 gcm/cm, and wherein the UCE may range from any lower limit to any upper limit and encompass any subset therebetween.

Some embodiments of the present invention may include conditioning the crimped tow band. Conditioning may be used to achieve a crimped tow band having a residual acetone content of about 0.5% or less w/w of the crimped tow band. Conditioning may be used to achieve a crimped tow band having a residual water content of about 8% or less w/w of the crimped tow band. Conditioning may involve exposing the filaments of the crimped tow band to steam, aerosolized compounds (e.g., plasticizers), liquids, heated fluids, direct heat sources, indirect heat sources, irradiation sources that causes additives in the filaments (e.g., nanoparticles) to produce heat, or any combination thereof.

Some embodiments of the present invention may include baling the crimped tow band to produce a bale. In some embodiments, baling may involve placing, e.g., laying, depositing, or arranging, the crimped tow band in a can in a pattern. It should be noted that can is used generically to refer to a container that may be in any shape, preferably square or rectangle, and of any material. As used herein, the term "pattern" refers to any design which may or may not change during placing. In some embodiments of the present invention, the pattern may be substantially zig-zag having a periodicity of about 0.5 cycles/ft to about 6 cycles/ft. In some embodiments, placing may involve puddling the crimped tow band with a puddling index of about 10 m/m to about 40 m/m. As used herein, the term "puddling" refers to allowing the tow band to lay at least partially on itself so as to place a greater actual length of tow band than linear distance on which it is placed. As used herein, the term "puddling index" refers to the length of tow band per linear distance on which it is placed.

In some embodiments of the present invention, baling may involve compressing the crimped tow band that has been placed in a suitable container. In some embodiments, baling may involve packaging the compressed crimped tow band. In some embodiments, the packaging may include at least one component like wrapping materials, vacuum ports (for releasing and/or pulling vacuum), securing elements, or any combination thereof. Suitable wrapping materials may include, but not be limited to, air-permeable materials, air-impermeable materials, films (e.g., polymeric films, polyethylene films, plastic wrap), heat-shrinkable films, cardboard, wood, woven materials (i.e., fabric composed of two sets of yarns interlaced with each other to form the fabric), non-woven materials (i.e., assemblies of textile fibers held together by mechanical or chemical means in a random web or mat, e.g., fused thermoplastic fibers), foil materials (e.g., metallic materials), and the like, or any combination thereof. Suitable securing elements may include, but not be limited to, VELCRO®, pins, hooks, straps (e.g., woven, non-woven, fabric, and/or metallic), adhesives, tapes, melt bondings, and the like, or any combination thereof. In some embodiments, at least a portion of the packaging (including any component thereof) may be reusable.

In some embodiments, bales may have dimensions ranging from about 30 inches (76 cm) to about 60 inches (152 cm) in height, about 46 inches (117 cm) to about 56 inches (142 cm) in length, and about 35 inches (89 cm) to about 45 inches (114 cm) in width. In some embodiments, bales may range in weight from 900 pounds (408 kg) to 2100 pounds (953 kg). In some embodiments, bales may have a density greater than about 300 kg/m$^3$ (18.8 lb/ft$^3$).

In some embodiments of the present invention, filaments may comprise additives. Some embodiments of the present invention may involve applying during any step outlined above or between any steps outlined above. Examples of suitable places to incorporate additives may include, but not be limited to, in the dope, in the finish, in the conditioning, or any combination thereof. Further, additives may be applied to the filaments at any point before forming the tow band, to the filaments during and/or after forming the tow band, to the filaments during and/or after crimping the tow band, to the filaments during and/or after conditioning, or any combination thereof.

Suitable additives may include, but not be limited to, active particles, active compounds, ion exchange resins, zeolites, nanoparticles, ceramic particles, softening agents, plasticizers, pigments, dyes, flavorants, aromas, controlled release vesicles, binders, adhesives, tackifiers, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, or any combination thereof. In some embodiments, achieving filaments that comprise an additive may be by including the additives in the dope; by applying the additives to the filaments before, after, and/or during formation of a tow band; by applying the additives to the filaments before, after, and/or during crimping the tow band; by applying the additives to the filaments before, after, and/or during conditioning the crimped tow band; and any combination thereof. It should be noted that applying includes, but is not limited to, dipping, immersing, submerging, soaking, rinsing, washing, painting, coating, showering, drizzling, spraying, placing, dusting, sprinkling, affixing, and any combination thereof. Further, it should be noted that applying includes, but is not limited to, surface treatments, infusion treatments where the additive incorporates at least partially into the filament, and any combination thereof.

One skilled in the art with the benefit of this disclosure should understand the concentration of the additive will depend at least on the composition of the additive, the size of the additive, the purpose of the additive, the point in the process in which the additive is included, and the size of the filament. By way of nonlimiting example, additives may be present in the dope in an amount ranging from about 0.01% to about 10% by weight of the polymer. By way of another nonlimiting example, additives that comprise particulates may be included such that the filament comprises about 0.01% to about 10% by volume of the filament.

Suitable active particles may include, but not be limited to, nano-scaled carbon particles, carbon nanotubes having at least one wall, carbon nanohorns, bamboo-like carbon nanostructures, fullerenes, fullerene aggregates, graphene, few layer graphene, oxidized graphene, iron oxide nanoparticles, nanoparticles, metal nanoparticles, gold nanoparticles, silver nanoparticles, metal oxide nanoparticles, an alumina nanoparticle, a magnetic nanoparticle, paramagnetic nanoparticle, a superparamagnetic nanoparticle, a gadolinium oxide nanoparticle, a hematite nanoparticle, a magnetite nanoparticle, a gado-nanotube, an endofullerene, $Gd@C_{60}$, a core-shell nanoparticle, an onionated nanoparticle, a nanoshell, an onionated iron oxide nanoparticle, activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, activated carbon, and any combination thereof.

Suitable active particles may have at least one dimension of about less than one nanometer, such as graphene, to as large as a particle having a diameter of about 5000 microns. Active particles may range from a lower size limit in at least one dimension of about: 0.1 nanometers, 0.5 nanometers, 1 nanometer, 10 nanometers, 100 nanometers, 500 nanometers, 1 micron, 5 microns, 10 microns, 50 microns, 100 microns, 150 microns, 200 microns, and 250 microns. The active particles may range from an upper size limit in at least one dimension of about: 5000 microns, 2000 microns, 1000 microns, 900 microns, 700 microns, 500 microns, 400 microns, 300 microns, 250 microns, 200 microns, 150 microns, 100 microns, 50 microns, 10 microns, and 500 nanometers. Any combination of lower limits and upper limits above may be suitable for use in the present invention, wherein the selected maximum size is greater than the selected minimum size. In some embodiments, the active particles may be a mixture of particle sizes ranging from the above lower and upper limits. In some embodiments, the size of the active particles may be polymodal.

Suitable active compounds may include, but not be limited to, malic acid, potassium carbonate, citric acid, tartaric acid, lactic acid, ascorbic acid, polyethyleneimine, cyclodextrin, sodium hydroxide, sulphamic acid, sodium sulphamate, polyvinyl acetate, carboxylated acrylate, and any combination thereof.

Suitable ion exchange resins may include, but not be limited to, polymers with a backbone, such as styrene-divinyl benezene (DVB) copolymer, acrylates, methacrylates, phenol formaldehyde condensates, and epichlorohydrin amine condensates; a plurality of electrically charged functional groups attached to the polymer backbone; and any combination thereof.

Zeolites may include crystalline aluminosilicates having pores, e.g., channels, or cavities of uniform, molecular-sized dimensions. Zeolites may include natural and synthetic materials. Suitable zeolites may include, but not be limited to, zeolite BETA ($Na_7(Al_7Si_{57}O_{128})$ tetragonal), zeolite ZSM-5 ($Na_n(Al_nSi_{96-n}O_{192})$ 16 $H_2O$, with n<27), zeolite A, zeolite X, zeolite Y, zeolite K-G, zeolite ZK-5, zeolite ZK-4, mesoporous silicates, SBA-15, MCM-41, MCM48 modified by 3-aminopropylsilyl groups, alumino-phosphates, mesoporous aluminosilicates, other related porous materials (e.g., such as mixed oxide gels), or any combination thereof.

Suitable nanoparticles may include, but not be limited to, nano-scaled carbon particles like carbon nanotubes of any number of walls, carbon nanohorns, bamboo-like carbon nanostructures, fullerenes and fullerene aggregates, and graphene including few layer graphene and oxidized graphene; metal nanoparticles like gold and silver; metal oxide nanoparticles like alumina, silica, and titania; magnetic, paramagnetic, and superparamagnetic nanoparticles like gadolinium oxide, various crystal structures of iron oxide like hematite and magnetite, about 12 nm $Fe_3O_4$, gado-nanotubes, and endofullerenes like $Gd@C_{60}$; and core-shell and onionated nanoparticles like gold and silver nanoshells, onionated iron oxide, and others nanoparticles or microparticles with an outer shell of any of said materials; or any combination of the foregoing (including activated carbon). It should be noted that nanoparticles may include nanorods, nanospheres, nanorices, nanowires, nanostars (like nanotripods and nanotetrapods), hollow nanostructures, hybrid nanostructures that are two or more nanoparticles connected as one, and non-nano particles with nano-coatings or nano-thick walls. It should be further noted that nanoparticles may include the functionalized derivatives of nanoparticles including, but not limited to, nanoparticles that have been functionalized covalently and/or non-covalently, e.g., pi-stacking, physisorption, ionic association, van der Waals association, and the like. Suitable functional groups may include, but not be limited to, moieties comprising amines (1°, 2°, or 3°), amides, carboxylic acids, aldehydes, ketones, ethers, esters, peroxides, silyls, organosilanes, hydrocarbons, aromatic hydrocarbons, and any combination thereof; polymers; chelating agents like ethylenediamine tetraacetate, diethylenetriaminepentaacetic acid, triglycollamic acid, and a structure comprising a pyrrole ring; and any combination thereof. Functional groups may enhance removal of smoke components and/or enhance incorporation of nanoparticles into a porous mass.

Suitable softening agents and/or plasticizers may include, but not be limited to, water, glycerol triacetate (triacetin), triethyl citrate, dimethoxy-ethyl phthalate, dimethyl phthalate, diethyl phthalate, methyl phthalyl ethyl glycolate, o-phenyl phenyl-(bis) phenyl phosphate, 1,4-butanediol diacetate, diacetate, dipropionate ester of triethylene glycol, dibutyrate ester of triethylene glycol, dimethoxyethyl phthalate, triethyl citrate, triacetyl glycerin, and the like, any derivative thereof, and any combination thereof. One skilled in the art with the benefit of this disclosure should understand the concentration of plasticizers to use as an additive to the filaments. By way of non-limiting example, the plasticizer may be added to the dope in an amount sufficient to prevent rupture or bursting of the filament surface upon sudden thermal discharge of the adsorbed solvent.

As used herein, pigments refer to compounds and/or particles that impart color and are incorporated throughout the filaments. Suitable pigments may include, but not be limited to, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, or any combination thereof.

As used herein, dyes refer to compounds and/or particles that impart color and are a surface treatment of the filaments. Suitable dyes may include, but not be limited to, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L).

Suitable flavorants may be any flavorant suitable for use in smoking device filters including those that impart a taste and/or a flavor to the smoke stream. Suitable flavorants may include, but not be limited to, organic material (or naturally flavored particles), carriers for natural flavors, carriers for artificial flavors, and any combination thereof. Organic materials (or naturally flavored particles) include, but are not limited to, tobacco, cloves (e.g., ground cloves and clove flowers), cocoa, and the like. Natural and artificial flavors may include, but are not limited to, menthol, cloves, cherry, chocolate, orange, mint, mango, vanilla, cinnamon, tobacco, and the like. Such flavors may be provided by menthol, anethole (licorice), anisole, limonene (citrus), eugenol (clove), and the like, or any combination thereof. In some embodiments, more than one flavorant may be used including any combination of the flavorants provided herein. These flavorants may be placed in the tobacco column or in a section of a filter. Additionally, in some embodiments, the porous masses of the present invention may comprise a flavorant. The amount to include will depend on the desired level of flavor in the smoke taking into account all filter sections, the length of the smoking device, the type of smoking device, the diameter of the smoking device, as well as other factors known to those of skill in the art.

Suitable aromas may include, but not be limited to, methyl formate, methyl acetate, methyl butyrate, ethyl acetate, ethyl butyrate, isoamyl acetate, pentyl butyrate, pentyl pentanoate, octyl acetate, myrcene, geraniol, nerol, citral, citronellal, citronellol, linalool, nerolidol, limonene, camphor, terpineol, alpha-ionone, thujone, benzaldehyde, eugenol, cinnamaldehyde, ethyl maltol, vanilla, anisole, anethole, estragole, thymol, furaneol, methanol, or any combination thereof.

Suitable binders may include, but not be limited to, polyolefins, polyesters, polyamides (or nylons), polyacrylics, polystyrenes, polyvinyls, polytetrafluoroethylene (PTFE), polyether ether ketone (PEEK), any copolymer thereof, any derivative thereof, and any combination thereof. Non-fibrous plasticized cellulose derivatives may also be suitable for use as binder particles in the present invention. Examples of suitable polyolefins may include, but not be limited to, polyethylene, polypropylene, polybutylene, polymethylpentene, and the like, any copolymer thereof, any derivative thereof, and any combination thereof. Examples of suitable polyethylenes may include, but not be limited to, ultrahigh molecular weight polyethylene, very high molecular weight polyethylene, high molecular weight polyethylene, low-density polyethylene, linear low-density polyethylene, high-density polyethylene, and the like, any copolymer thereof, any derivative thereof, and any combination thereof. Examples of suitable polyesters may include, but not be limited to, polyethylene terephthalate, polybutylene terephthalate, polycyclohexylene dimethylene terephthalate, polytrimethylene terephthalate, and the like, any copolymer thereof, any derivative thereof, and any combination thereof. Examples of suitable polyacrylics may include, but not be limited to, polymethyl methacrylate, and the like, any copolymer thereof, any derivative thereof, and any combination thereof. Examples of suitable polystyrenes may include, but not be limited to, polystyrene, acrylonitrile-butadiene-styrene, styrene-acrylonitrile, styrene-butadiene, styrene-maleic anhydride, and the like, any copolymer thereof, any derivative thereof, and any combination thereof. Examples of suitable polyvinyls may include, but not be limited to, ethylene vinyl acetate, ethylene vinyl alcohol, polyvinyl chloride, and the like, any copolymer thereof, any derivative thereof, and any combination thereof. Examples of suitable cellulosics may include, but not be limited to, cellulose acetate, cellulose acetate butyrate, plasticized cellulosics, cellulose propionate, ethyl cellulose, and the like, any copolymer thereof, any derivative thereof, and any combination thereof. In some embodiments, binder particles may comprise any copolymer, any derivative, or any combination of the above listed binders. Further, binder particles may be impregnated with and/or coated with any combination of additives disclosed herein.

Suitable tackifiers may include, but not be limited to, methylcellulose, ethylcellulose, hydroxyethylcellulose, carboxy methylcellulose, carboxy ethylcellulose, water soluble cellulose acetate, amides, diamines, polyesters, polycarbonates, silyl-modified polyamide compounds, polycarbamates, urethanes, natural resins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly (butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, or any combination thereof.

Suitable lubricating agents may include, but not be limited to, ethoxylated fatty acids (e.g., the reaction product of ethylene oxide with pelargonic acid to form poly(ethylene glycol) ("PEG") monopelargonate; the reaction product of ethylene oxide with coconut fatty acids to form PEG monolaurate), and the like, or any combination thereof. The lubricant agents may also be selected from non-water soluble materials such as synthetic hydrocarbon oils, alkyl esters (e.g., tridecyl stearate which is the reaction product of tridecyl alcohol and stearic acid), polyol esters (e.g., trimethylol propane tripelargonate and pentaerythritol tetrapelargonate), and the like, or any combination thereof.

Suitable emulsifiers may include, but not be limited to, sorbitan monolaurate, e.g., SPAN® 20 (available from Uniqema, Wilmington, Del.), poly(ethylene oxide) sorbitan monolaurate, e.g., TWEEN® 20 (available from Uniqema, Wilmington, Del.).

Suitable vitamins may include, but not be limited to, vitamin A, vitamin B1, vitamin B2, vitamin C, vitamin D, vitamin E, or any combination thereof.

Suitable antimicrobials may include, but not be limited to, anti-microbial metal ions, chlorhexidine, chlorhexidine salt, triclosan, polymoxin, tetracycline, amino glycoside (e.g., gentamicin), rifampicin, bacitracin, erythromycin, neomycin, chloramphenicol, miconazole, quinolone, penicillin, nonoxynol 9, fusidic acid, cephalosporin, mupirocin, metronidazolea secropin, protegrin, bacteriolcin, defensin, nitrofurazone, mafenide, acyclovir, vanocmycin, clindamycin, lincomycin, sulfonamide, norfloxacin, pefloxacin, nalidizic acid, oxalic acid, enoxacin acid, ciprofloxacin, polyhexamethylene biguanide (PHMB), PHMB derivatives (e.g., biodegradable biguanides like polyethylene hexaniethylene biguanide (PEHMB)), clilorhexidine gluconate, chlorohexidine hydrochloride, ethylenediaminetetraacetic acid (EDTA), EDTA derivatives (e.g., disodium EDTA or tetrasodium EDTA), and the like, and any combination thereof.

Antistatic agents may comprise any suitable anionic, cationic, amphoteric or nonionic antistatic agent. Anionic antistatic agents may generally include, but not be limited to, alkali sulfates, alkali phosphates, phosphate esters of alcohols, phosphate esters of ethoxylated alcohols, or any combination thereof. Examples may include, but not be limited to, alkali neutralized phosphate ester (e.g., TRYFAC® 5559 or TRYFRAC® 5576, available from Henkel Corporation, Mauldin, S.C.). Cationic antistatic agents may generally include, but not be limited to, quaternary ammonium salts and imidazolines which possess a positive charge. Examples of nonionics include the poly(oxyalkylene) derivatives, e.g., ethoxylated fatty acids like EMEREST® 2650 (an ethoxylated fatty acid, available from Henkel Corporation, Mauldin, S.C.), ethoxylated fatty alcohols like TRYCOL® 5964 (an ethoxylated lauryl alcohol, available from Henkel Corporation, Mauldin, S.C.), ethoxylated fatty amines like TRYMEEN® 6606 (an ethoxylated tallow amine, available from Henkel Corporation, Mauldin, S.C.), alkanolamides like EMID® 6545 (an oleic diethanolamine, available from Henkel Corporation, Mauldin, S.C.), or any combination thereof. Anionic and cationic materials tend to be more effective antistats.

II. Filters, Smoking Devices, and Methods of Producing

In some embodiments of the present invention, a bale of crimped tow band having a high dpf and a low total denier may be used to form filter rods, filter sections, or any combination thereof that are suitable for use with smoking devices. Examples of suitable high dpf and low total denier tow bands may be those according to the various embodiments disclosed herein. In some embodiments, a bale of crimped tow band having about 10 dpf or greater and about 20,000 total denier or less may be used in producing filter rods, filter sections, or any combination thereof. In some embodiments, a bale may comprise more than one tow band.

In some embodiments of the present invention, filter rods, filters, and/or filter sections may have a circumference less than about 17 mm and an encapsulated pressure drop (EPD) of about 3.5 mm water/mm length or less, about 2.5 mm water/mm length or less, or about 2 mm water/mm length or less.

In some embodiments of the present invention, filter rods, filters, and/or filter sections may have a circumference of about 17 mm or less and an effective amount of an additive to achieve an EPD of about 3.5 to about 20 mm water/mm length or less, wherein without the additive the filter rods, filters, and/or filter sections may have an EPD of about 3 mm water/mm length or less. In some embodiments, filter rods, filters, and/or filter sections may have a circumference of about 17 mm or less and an effective amount of an additive to achieve an EPD of about 2.5 to about 20 mm water/mm length or less, wherein without the additive the filter rods, filters, and/or filter sections may have an EPD of about 2 mm water/mm length or less.

In some embodiments of the present invention, filter rods, filters, and/or filter sections may have a circumference of about 26 mm or less and an effective amount of an additive to achieve an EPD of about 3.5 to about 20 mm water/mm length or less, wherein without the additive the filter rods, filters, and/or filter sections may have an EPD of about 3 mm water/mm length or less. In some embodiments, filter rods, filters, and/or filter sections may have a circumference of about 26 mm or less and an effective amount of an additive to achieve an EPD of about 2.5 to about 20 mm water/mm length or less, wherein without the additive the filter rods, filters, and/or filter sections may have an EPD of about 2 mm water/mm length or less.

In some embodiments of the present invention, filter rods, filters, and/or filter sections may have an EPD with a coefficient of variability of about 7% or less, 6% or less, 5% or less, or 4% or less.

In some embodiments, filter rods, filters, and/or filter sections may be capable of allowing about 5 mg or greater of tar in a smoke stream to pass therethrough over a length of about 1 cm or greater.

In some embodiments of the present invention, producing filter rods, filters, and/or filter sections may include feeding a tow band (crimped or otherwise) having a high dpf and a low total denier from a bale into an apparatus capable of producing filter rods. In some embodiments of the present invention, producing a filter rod may include several steps including, but not limited to, at least one of the following: blooming the crimped tow band into a bloomed tow band; optionally treating the bloomed tow band with an additive; channeling the bloomed tow band yielding a continuous tow cable; wrapping a continuous tow cable with a paper yielding a wrapped tow rod; adhering the paper of a wrapped tow rod yielding a filter rod length; cutting the filter rod length into filter rods, filters, and/or filter sections; or any combination thereof. In some embodiments, producing filters and/or filter sections may involve cutting filter rod lengths or filter rods. In some embodiments, producing filter sections may involve cutting filter rod lengths, filter rods, or filters.

In some embodiments, wrapped tow rods, filter rod lengths, filter rods, and/or filter sections may have a circumference of greater than about 26 mm, about 25 to about 26 mm, less than about 25 mm, less than about 23 mm, about 23 mm or greater, about 23.5 mm or less, about 17 mm to about 25 mm, or about 17 mm or less. The circumference of wrapped tow rods, filter rod lengths, filter rods, and/or filter sections may range from a lower limit of about 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, or 26 mm to an upper limit of about 60 mm, 50 mm, 40 mm, 30 mm, 20 mm, 29 mm, 28 mm, 27 mm, 26 mm, 25 mm, 24 mm, 23 mm, 22 mm, 21 mm, 20 mm, 19 mm, 18 mm, 17 mm, or 16 mm, wherein the circumference may range from any lower limit to any upper limit and encompass any subset therebetween.

In some embodiments of the present invention, filter rod lengths, filter rods, and/or filter sections may have any cross-sectional shape including, but not limited to, circular, substantially circular, ovular, substantially ovular, polygonal (including those with rounded corners), or any hybrid thereof.

Some embodiments of the present invention may involve treating the bloomed tow band with additives, at least once. In some embodiments, treating may occur while the bloomed tow band has a large edge-to-edge width and/or while channeling the bloomed tow band. It may be advantageous, but not required, that when the additive is in a particulate form, said treating occurs during channeling. It should be noted that treating may be done by any method including, but not limited to, applying, dipping, immersing, submerging, soaking, rinsing, washing, painting, coating, showering, drizzling, spraying, placing, dusting, sprinkling, affixing, or any combination thereof.

Suitable additives may be those delineated above including, but not limited to, active particles, active compounds, ion exchange resins, zeolites, nanoparticles, ceramic particles, softening agents, plasticizers, pigments, dyes, flavorants, aromas, controlled release vesicles, binders, adhesives, tackifiers, surface modification agents, lubricating agents, emulsifiers, vitamins, peroxides, biocides, antifungals, antimicrobials, antistatic agents, flame retardants, antifoaming agents, degradation agents, conductivity modifying agents, stabilizing agents, and any combination thereof.

In some embodiments of the present invention, additives, e.g., active particles and/or active compounds, may be capable of reducing and/or removing a smoke stream component from a smoke stream. One skilled in the art, with the benefit of this disclosure should understand that a smoke stream may be interchanged with a fluid stream for other filter applications. Examples of smoke stream components may include, but not be limited to, acetaldehyde, acetamide, acetone, acrolein, acrylamide, acrylonitrile, aflatoxin B-1,4-aminobiphenyl, 1-aminonaphthalene, 2-aminonaphthalene, ammonia, ammonium salts, anabasine, anatabine, 0-anisidine, arsenic, A-α-C, benz[a]anthracene, benz[b]fluoroanthene, benz[j]aceanthrylene, benz[k]fluoroanthene, benzene, benzo(b)furan, benzo[a]pyrene, benzo[c]phenanthrene, beryllium, 1,3-butadiene, butyraldehyde, cadmium, caffeic acid, carbon monoxide, catechol, chlorinated dioxins/furans, chromium, chrysene, cobalt, coumarin, a cresol, crotonaldehyde, cyclopenta[c,d]pyrene, dibenz(a,h)acridine, dibenz (a,j)acridine, dibenz[a,h]anthracene, dibenzo(c,g)carbazole, dibenzo[a,e]pyrene, dibenzo[a,h]pyrene, dibenzo[a,i]pyrene, dibenzo[a,l]pyrene, 2,6-dimethylaniline, ethyl carbamate (urethane), ethylbenzene, ethylene oxide, eugenol, formaldehyde, furan, glu-P-1, glu-P-2, hydrazine, hydrogen cyanide, hydroquinone, indeno[1,2,3-cd]pyrene, IQ, isoprene, lead, MeA-α-C, mercury, methyl ethyl ketone, 5-methylchrysene, 4-(methylnitrosamino)-1-(3-pyridyI)-1-butanone (NNK), 4-(methylnitrosamino)-1-(3-pyridyl)-1-butanol (NNAL), naphthalene, nickel, nicotine, nitrate, nitric oxide, a nitrogen oxide, nitrite, nitrobenzene, nitromethane, 2-nitropropane, N-nitrosoanabasine (NAB), N-nitrosodiethanolamine (NDELA), N-nitrosodiethylamine, N-nitrosodimethylamine (NDMA), N-nitrosoethylmethylamine, N-nitrosomorpholine (NMOR), N-nitrosonornicotine (NNN), N-nitrosopiperidine (NPIP), N-nitrosopyrrolidine (NPYR), N-nitrososarcosine (NSAR), phenol, PhIP, polonium-210 (radio-isotope), propionaldehyde, propylene oxide, pyridine, quinoline, resorcinol, selenium, styrene, tar, 2-toluidine, toluene, Trp-P-1, Trp-P-2, uranium-235 (radio-isotope), uranium-238 (radio-isotope), vinyl acetate, vinyl chloride, or any combination thereof. In some embodiments of the present invention, additives may be capable of reducing and/or removing a component from a fluid stream. Suitable components may include, but not be limited to, dust particulates, pollen, mold, bacteria, ozone, and the like, or any combination thereof.

Suitable papers may include, but not be limited to, tipping papers, plug wrap papers, tipping base papers, wood-based papers, paper containing flaxs, flax papers, functionalized papers, special marking papers, colorized papers, high porosity papers, corrugated papers, high surface strength papers, or any combination thereof. One skilled in the art, with the benefit of this disclosure, should recognize that the paper may be substituted with any known sheet material. In some embodiments, papers may comprise additives, sizings, printability agents, or any combination thereof.

Some embodiments of the present invention may involve adhering the paper of a wrapped tow rod yielding a filter rod length. Adhering may be achieved with any known adhesive capable of adhesively securing the paper wrapped about the tow rod.

Some embodiments of the present invention may involve cutting the filter rod length into filter rods and/or filter sections. Cutting may involve any known method and/or apparatus of cutting. The length of a filter rod may range from a lower limit of about 50 mm, 75 mm, or 100 mm to an upper limit of about 150 mm, 140 mm, 130 mm, 120 mm, 110 mm, or 100 mm, and wherein the length may range from any lower limit to any upper limit and encompass any subset therebetween. The length of a filter may range from a lower limit of about 20 mm, 25 mm, or 30 mm to an upper limit of about 50 mm, 45 mm, or 40 mm, and wherein the length may range from any lower limit to any upper limit and encompass any subset therebetween. The length of a filter section may range from a lower limit of about 3 mm, 4 mm, or 5 mm to an upper limit of about 15 mm, 14 mm, 13 mm, 12 mm, 11 mm, or 10 mm, and wherein the length may range from any lower limit to any upper limit and encompass any subset therebetween.

Some embodiments of the present invention may involve connecting at least two filter sections. Some embodiments may involve connecting at least two filter sections in fluid communication with each other. Connecting may include, but not be limited to, joining, attaching, combining, associating, coupling, or the like. In some embodiments, connecting may be end-to-end along the longitudinal axis of the filter sections. In some embodiments, connecting at least two filter sections may form a sectioned filter and/or a sectioned filter rod. Some embodiments may involve providing at least two filter sections in respective containers, e.g., hoppers, crates, boxes, drums, bags, or cartons, before connecting. Some embodiments may comprise feeding the at least two filter sections into a row wherein the sections are alternated. Some embodiments may involve wrapping the at least two filter sections with a paper to form a segmented filter and/or a segmented filter rod. Some embodiments may involve transporting the segmented filter and/or the segmented filter rod for storage or use.

In some embodiments, a filter may be a sectioned filter. Some embodiments may involve sectioned filter where at least one first section is a filter section described herein and at least one second filter section may include, but not be limited, cavities, porous masses, polypropylene, polyethylene, polyolefin tow, polypropylene tow, polyethylene terephthalate, polybutylene terephthalate, random oriented acetate, papers, corrugated papers, concentric filters, carbon-on-tow, silica, magnesium silicate, zeolites, molecular sieves, salts, catalysts, sodium chloride, nylon, flavorants, tobacco, capsules, cellulose, cellulosic derivatives, cellulose acetate, catalytic converters, iodine pentoxide, coarse powders, carbon particles, carbon fibers, fibers, glass beads, nanoparticles, void chambers, baffled void chambers, or any combination thereof. It should be noted, that first and second are used for clarity in the description and do not imply any order or positional relationship. In some embodiments, the second filter section may be a cellulose acetate filter section having a different EPD than the first filter section. In some embodiments, the first filter section and the second filter section may be different filter sections described herein, e.g., different additives, different additive concentrations, different EPD, different total denier, different dpf, or any combination thereof.

In some embodiments of the present invention, filter rods, filters, filter sections, sectioned filters, and/or sectioned filter rods may comprise at least one cavity. In some embodiments, a cavity may be between two filter sections. The cavity may be filled with a variety of substances including, but not limited to, additives, granulated carbon, flavorants, catalysts, molecular sieves, zeolites, or any combination thereof. The cavity may contain a capsule, e.g., a polymeric capsule, that itself contains a flavorant or catalyst. The cavity, in some embodiments, may also contain a molecular sieve that reacts with selected components in the smoke to remove or reduce the concentration of the components without adversely affecting desirable flavor constituents of the smoke. In some embodiments, the cavity may include tobacco as an additional flavorant. It should be noted that a cavity insufficiently filled with a chosen substance may lack sufficient interaction between the components of the mainstream smoke and the substance in the cavity.

Some embodiments of the present invention may involve operably connecting filter rods, filters, filter sections, sectioned filters, and/or sectioned filter rods to a smokeable substance. Some embodiments may involve connecting filter rods, filters, filter sections, sectioned filters, and/or sectioned filter rods to a smokeable substance such that the filter rods, filters, filter sections, sectioned filters, and/or sectioned filter rods are in fluid communication with the smokeable substance.

In some embodiments of the present invention, a filter rod, a filter, a filter section, a sectioned filter, and/or a sectioned filter rod may be in fluid communication with a smokeable substance. In some embodiments, a smoking device may comprise a filter rod, a filter, a filter section, a sectioned filter, and/or a sectioned filter rod in fluid communication with a smokeable substance. In some embodiments of the present invention, a smoking device may comprise a housing operably capable of maintaining a filter rod, a filter, a filter section, a sectioned filter, and/or a sectioned filter rod in fluid communication with a smokeable substance. In some embodiments, filter rods, filters, filter sections, sectioned filters, and/or sectioned filter rods may be removable, replaceable, and/or disposable from the housing.

As used herein, the term "smokeable substance" refers to a material capable of producing smoke when burned or heated. Suitable smokeable substances may include, but not be limited to, tobaccos, e.g., bright leaf tobacco, Oriental tobacco, Turkish tobacco, Cavendish tobacco, corojo tobacco, criollo tobacco, Perique tobacco, shade tobacco, white burley tobacco, flue-cured tobacco, Burley tobacco, Maryland tobacco, Virginia tobacco; teas; herbs; carbonized or pyrolyzed components; inorganic filler components; or any combination thereof. Tobacco may have the form of tobacco laminae in cut filler form, processed tobacco stems, reconstituted tobacco filler, volume expanded tobacco filler, or the like. Tobacco, and other grown smokeable substances, may be grown in the United States, or may be grown in a jurisdiction outside the United States.

In some embodiments, a smokeable substance may be in a column format, e.g., a tobacco column. As used herein, the term "tobacco column" refers to the blend of tobacco, and optionally other ingredients and flavorants that may be combined to produce a tobacco-based smokeable article, such as a cigarette or cigar. In some embodiments, the tobacco column may comprise ingredients selected from the group consisting of: tobacco, sugar (such as sucrose, brown sugar, invert sugar, or high fructose corn syrup), propylene glycol, glycerol, cocoa, cocoa products, carob bean gums, carob bean extracts, and any combination thereof. In still other embodiments, the tobacco column may further comprise flavorants, aromas, menthol, licorice extract, diammonium phosphate, ammonium hydroxide, and any combination thereof. In some embodiments, tobacco columns may comprise additives. In some embodiments, tobacco columns may comprise at least one bendable element.

Suitable housings may include, but not be limited to, cigarette, cigarette holder, cigars, cigar holders, pipes, water pipes, hookahs, electronic smoking devices, roll-your-own cigarettes, roll-your-own cigars, papers, or any combination thereof.

In some embodiments of the present invention, filter rods, filters, filter sections, sectioned filters, and/or sectioned filter rods may be degradable over time either naturally or in the presence of a catalyst. As used herein, the term "degradable" refers to the ability to decompose when exposed to an outdoor environment (i.e., exposed to rain, dew, or other sources of water). The degree of degradation is, at a minimum, sufficient to convert the cellulose acetate into cellulose and, at a maximum, sufficient to convert the cellulose acetate into glucose. In some embodiments, degradation may occur over at least 1 month, about 6 months or less, about 2 years or less, or about 5 years or less. One skilled in the art with the benefit of this disclosure should understand that the environmental condition, e.g., exposure to light and relative humidity, and the additives, e.g., catalysts, of the filter rods, filters, filter sections, sectioned filters, and/or sectioned filter rods will affect the rate of degradation.

In some embodiments of the present invention, the filter rods, filters, filter sections, sectioned filters, and/or sectioned filter rods may be recycleable.

In some embodiments of the present invention, a pack of filters may comprise filter rods, filters, filter sections, sectioned filters, and/or sectioned filter rods according to any embodiment described herein. Packs may be a hinge-lid pack, a slide-and-shell pack, a hard cup pack, a soft cup pack, or any other suitable pack container. In some embodiments, packs may have an outer wrapping, such as a polypropylene wrapper, and optionally a tear tab. In some embodiments, the filter rods, filters, filter sections, sectioned filters, and/or sectioned filter rods may be sealed as a bundle inside a pack. A bundle may contain any number of filter rods, filters, filter sections, sectioned filters, and/or sectioned filter rods, e.g., 10 or more. However, a bundle may include single filter rods, filters, filter sections, sectioned filters, and/or sectioned filter rods, such as exclusive filter embodiments like those for individual sale, or those comprising a specific spice, like vanilla, clove, or cinnamon.

In some embodiments, a pack of smoking devices may comprise at least one smoking device having a filter rod, a filter, a filter section, a sectioned filter, and/or a sectioned filter rod according to any embodiment described herein. Packs may be a hinge-lid pack, a slide-and-shell pack, a hard cup pack, a soft cup pack, or any other suitable pack container. In some embodiments of the present invention, the smoking devices may be sealed as a bundle inside a pack. A bundle may contain a number of smoking devices, e.g., 10 or more. However, a bundle may include a single smoking device, in some embodiments, such as exclusive smoking embodiments like a cigar, or a smoking device comprising a specific spice, like vanilla, clove, or cinnamon.

In some embodiments, the present invention provides a carton of smoking device packs that includes at least one pack of smoking devices that includes at least one smoking device having a filter rod, a filter, a filter section, a sectioned filter, and/or a sectioned filter rod according to any embodiment described herein. In some embodiments, the carton (e.g., a container) has the physical integrity to contain the weight from the packs of cigarettes.

Because it is expected that a consumer will smoke a smoking device that includes a filter rod, a filter, a filter section, a sectioned filter, and/or a sectioned filter rod according to any embodiment described herein, the present invention also provides methods of smoking such a smoking device. For example, in one embodiment, the present invention provides a method of smoking a smoking device comprising: heating or lighting a smoking device to form smoke, the smoking device comprising a filter rod, a filter, a filter section, a sectioned filter, and/or a sectioned filter rod according to any embodiment described herein; and drawing the smoke through the smoking device, wherein the filter rod, the filter, the filter section, the sectioned filter, and/or the sectioned filter rod reduces the presence of at least one component in the smoke stream. In some embodiments, the smoking device is a cigarette. In other embodiments, the smoking device is a cigar, a pipe, a water pipe, a hookah, an electronic smoking device, a smokeless smoking device, a roll-your-own cigarette, a roll-your-own cigar, or another smoking device.

Some embodiments of the present invention may involve crimping the tow band thereby yielding a crimped tow band; conditioning the crimped tow band; and baling the crimped tow band to form a bale. Generally said tow band may have about 10 denier per filament or greater and about 20,000 total denier or less, the tow band comprising a plurality of cellulose acetate filaments.

Some embodiments of the present invention may involve treating a plurality of cellulose acetate filaments having about 10 denier per filament or greater with a finish emulsion comprising about 95% water or less thereby yielding a plurality of finished filaments; forming a tow band from at least a portion of the finished filaments, the tow band having about 20,000 total denier or less; crimping the tow band thereby yielding a crimped tow band comprising filaments with a substantially lateral crimp configuration; conditioning the crimped tow band; and baling the crimped tow band to form a bale.

Some embodiments of the present invention may involve crimping the tow band thereby yielding a crimped tow band comprising filaments with a substantially lateral crimp configuration; conditioning the crimped tow band; and baling the crimped tow band to form a bale. Generally said tow band has about 10 denier per filament or greater and about 20,000 total denier or less, comprises a plurality of cellulose acetate filaments, and has a moisture content of about 5% to about 25% w/w of the tow band.

Some embodiments of the present invention may involve providing a tow band having about 10 denier per filament or greater and about 20,000 total denier or less, the tow band comprising a plurality of cellulose acetate filaments; applying a tackifier to at least a portion of the filaments; crimping the tow band thereby yielding a crimped tow band; conditioning the crimped tow band; and baling the crimped tow band to form a bale.

Some embodiments of the present invention may involve providing a tow band having about 10 denier per filament or greater and about 20,000 total denier or less, the tow band comprising a plurality of cellulose acetate filaments; applying a tackifier to at least a portion of the filaments; crimping the tow band thereby yielding a crimped tow band; conditioning the crimped tow band; and baling the crimped tow band to form a bale.

Some embodiments of the present invention may generally include a bale that includes a crimped tow band having about 10 denier per filament or greater and about 20,000 total denier or less, the crimped tow band comprising a plurality of cellulose acetate filaments.

Some embodiments of the present invention may involve placing the crimped tow band from a bale into an apparatus so as to form a filter rod. Generally said crimped tow band has about 10 denier per filament or greater and about 20,000 total denier or less and comprises a plurality of cellulose acetate filaments.

Some embodiments of the present invention may include a filter that includes a tow having about 10 denier per filament or greater and about 20,000 total denier or less, the tow comprising a plurality of cellulose acetate filaments. Said filter may generally have an encapsulated pressure drop of about 3.5 mm water/mm length of filter or less and have a circumference of about 26 mm or less.

Some embodiments of the present invention may include a filter that includes a tow having about 10 denier per filament or greater and about 20,000 total denier or less, the tow comprising a plurality of cellulose acetate filaments; and an additive. Said filter may generally have an encapsulated pressure drop of about 3.5 to about 20 mm water/mm length of filter, wherein without the additive the filter has an encapsulated pressure drop of about 3 mm water/mm length of filter or less, and the filter may have a circumference of about 26 mm or less.

Some embodiments of the present invention may include a filter that includes a tow comprising a plurality of cellulose acetate filaments; and an additive. Said filter may generally have an encapsulated pressure drop of about 3.5 to about 20 mm water/mm length of filter, wherein without the additive the filter has an encapsulated pressure drop of about 3 mm water/mm length of filter rod or less, and the filter may have a circumference of about 26 mm or less.

Some embodiments of the present invention may include a smoking device that includes a smokeable substance; and a filter comprising a tow having about 10 denier per filament or greater and about 20,000 total denier or less, the tow comprising a plurality of cellulose acetate filaments. Said filter may generally have an encapsulated pressure drop of about 3.5 mm water/mm length of filter or less and have a circumference of about 17 mm or less.

Some embodiments of the present invention may include a smoking device filter that includes a first section that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less; and a second filter section.

Some embodiments of the present invention may include a smoking device that includes a filter having a circumference of about 26 mm or less and comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less; and a housing capable of maintaining a smokeable substance in fluid contact with the filter.

Some embodiments of the present invention may include a pack of filters that includes a pack comprising at least a plurality of filters having a circumference of about 26 mm or less, the filters comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less.

Some embodiments of the present invention may include a pack of smoking devices that includes a pack comprising at least one smoking device that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less.

Some embodiments of the present invention may include a pack of smoking devices that includes a pack comprising at least one smoking device that comprises a filter having a circumference of about 26 mm or less, the filters comprising an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less.

Some embodiments of the present invention may include a carton of smoking device packs that includes a carton comprising at least one pack, the pack comprising at least one smoking device that comprises a filter that comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less.

Some embodiments of the present invention may involve heating or lighting a smoking device to form smoke, wherein the smoking device comprises at least one filter section comprising a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; and drawing the smoke through the smoking device, wherein the filter section reduces the presence of at least one component in the smoke as compared to a filter without the filter section.

Some embodiments of the present invention may involve providing a first filter section; providing at least one second filter section, wherein the second filter section comprises a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; and joining the first filter section and at least one second filter section so as to form a filter rod.

Some embodiments of the present invention may involve providing a first filter section; providing at least one second filter section, wherein the second filter section has a circumference of about 26 mm or less and comprises an effective amount of an additive to achieve an encapsulated pressure drop of about 3.5 to about 20 mm water/mm length of filter rod, wherein without the additive the filter rod has an encapsulated pressure drop of about 3 mm water/mm length of filter rod or less; and joining the first filter section and at least one second filter section so as to form a filter rod.

Some embodiments of the present invention may involve providing a container that comprises at least a plurality of first filter sections; providing a second container comprising at least a plurality of second filter sections, wherein the second filter sections comprise a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 26 mm or less; joining a first filter section and a second filter section end-to-end along the longitudinal axis of the first filter and the second filter to form an unwrapped filter rod; and wrapping the first filter section and the second filter section with a paper to form a filter rod.

Some embodiments of the present invention may involve providing a filter rod comprising at least one filter section that comprises a tow having about 10 denier per filament or greater and about 20,000 total denier or less, the tow comprising a plurality of cellulose acetate filaments, and the filter section having an encapsulated pressure drop of about 3.5 mm water/mm length of filter section or less, the filter section having a circumference of about 26 mm or less; providing a tobacco column; cutting the filter rod transverse to its longitudinal axis through the center of the rod to form at least two smoking device filters having at least one filter section that comprises a porous mass that comprises an active particle and a binder particle; and joining at least one of the smoking device filters to the tobacco column along the longitudinal axis of the filter and the longitudinal axis of the tobacco column to form at least one smoking device.

Some embodiments of the present invention may involve providing a tobacco column; joining a filter to the tobacco column, wherein the filter comprises a tow having about 10 denier per filament or greater and about 20,000 total denier or less, the tow comprising a plurality of cellulose acetate filaments, and the filter having an encapsulated pressure drop of about 3.5 mm water/mm length of filter or less, the filter having a circumference of about 17 mm or less.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A filter comprising:
   a tow comprising a plurality of cellulose acetate filaments, wherein the tow has about 10 denier per filament or greater and about 15,000 total denier or less; and
   an additive,
   the filter having an encapsulated pressure drop of about 3.5 to about 20 mm water/mm length of filter, wherein without the additive the filter has an encapsulated pressure drop of about 3 mm water/mm length of filter or less, and the filter having a circumference of about 26 mm or less.

2. The filter of claim 1, wherein the filter has a circumference of about 17 mm or less.

3. The filter of claim 1, wherein the encapsulated pressure drop of the filter with the additive has coefficient of variability less than about 7%.

4. The filter of claim 1, wherein the encapsulated pressure drop of the filter with the additive about 2 mm water/mm length of filter or less.

5. The filter of claim 1, wherein the additive comprises at least one selected from the group consisting of: a nano-scaled carbon particle, a carbon nanotube having at least one wall, a carbon nanohorn, a bamboo-like carbon nanostructure, a fullerene, a fullerene aggregate, graphene, a few layer graphene, oxidized graphene, an iron oxide nanoparticle, a nanoparticle, a metal nanoparticle, a gold nanoparticle, a silver nanoparticle, a metal oxide nanoparticle, an alumina nanoparticle, a magnetic nanoparticle, a paramagnetic nanoparticle, a superparamagnetic nanoparticle, a gadolinium oxide nanoparticle, a hematite nanoparticle, a magnetite nanoparticle, a gado-nanotube, an endofullerene, Gd@C60, a core-shell nanoparticle, an onionated nanoparticle, a nanoshell, an onionated iron oxide nanoparticle, activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, and any combination thereof.

6. A pack of filters comprising:
   a pack comprising at least a plurality according to the filter of claim 1.

7. A smoking device filter comprising:
   a first section according to the filter of claim 1;
   and a second filter section.

8. A smoking device comprising:
   a filter having a circumference of about 26 mm or less and comprising a tow comprising a plurality of cellulose acetate filaments and an effective amount of an additive to achieve an encapsulated pressure drop of about 3.5 to about 20 mm water/mm length of filter, wherein the tow has about 10 denier per filament or greater and about 15,000 total denier or less, wherein without the additive the filter rod has an encapsulated pressure drop of about 3 mm water/mm length of filter rod or less; and
   a housing capable of maintaining a smokeable substance in fluid contact with the filter.

9. The smoking device of claim 8, wherein the filter has a circumference of about 17 mm or less.

10. The smoking device of claim 8, wherein the encapsulated pressure drop of the filter with the additive has coefficient of variability less than about 7%.

11. The smoking device of claim 8, wherein the encapsulated pressure drop of the filter with the additive about 2 mm water/mm length of filter or less.

12. The smoking device of claim 8, wherein the additive comprises at least one selected from the group consisting of: a nano-scaled carbon particle, a carbon nanotube having at least one wall, a carbon nanohorn, a bamboo-like carbon nanostructure, a fullerene, a fullerene aggregate, graphene, a few layer graphene, oxidized graphene, an iron oxide nanoparticle, a nanoparticle, a metal nanoparticle, a gold nanoparticle, a silver nanoparticle, a metal oxide nanoparticle, an alumina nanoparticle, a magnetic nanoparticle, a paramagnetic nanoparticle, a superparamagnetic nanoparticle, a gadolinium oxide nanoparticle, a hematite nanoparticle, a magnetite nanoparticle, a gado-nanotube, an endofullerene, Gd@C60, a core-shell nanoparticle, an onionated nanoparticle, a nanoshell, an onionated iron oxide nanoparticle, activated carbon, an ion exchange resin, a desiccant, a silicate, a molecular sieve, a silica gel, activated alumina, a zeolite, perlite, sepiolite, Fuller's Earth, magnesium silicate, a metal oxide, iron oxide, and any combination thereof.

13. The smoking device of claim 8, wherein the housing is at least one selected from the group consisting of: a cigarette, a cigarette holder, a cigar, a cigar holder, a pipe, a water pipe, a hookah, an electronic smoking device, a roll-your-own cigarette, a roll-your-own cigar, and a paper.

14. The smoking device of claim 8, wherein the filter comprises a plurality of sections.

15. A pack of smoking devices comprising:
   a pack comprising at least one smoking device according to claim 8.

* * * * *